United States Patent Office 3,530,086
Patented Sept. 22, 1970

3,530,086
SULFUR-CONTAINING DERIVATIVES OF METHYLOLATED AMINOTRIAZINES
Daniel Porret and Ewald Forster, Binningen, and Juerg Maurer, Riehen, Switzerland, assignors to Ciba Limited, Basel, Switzerland, a company of Switzerland
No Drawing. Filed Feb. 13, 1968, Ser. No. 705,012
Claims priority, application Switzerland, Feb. 24, 1967, 2,737/67
Int. Cl. C08g 9/04; C07d 55/20, 55/22
U.S. Cl. 260—30.2         3 Claims

ABSTRACT OF THE DISCLOSURE

The invention relates to new sulphur-containing derivatives of methylolated aminotriazines, suitable for use as plasticizers for quick-curing aminoplast moulding compositions, said derivatives being condensation products of (I) 1.8 to 2.2 mols, preferably about 2 mols, of a methylolated amino-s-triazine containing at least two amino groups, more than 80% of whose methylol groups are etherified with a lower aliphatic alcohol containing 1 to 4 carbon atoms, and (II) 1 mol of a dialcohol or dimercaptan containing at least one thioether bridge.

---

It is known to increase substantially the curing speed of aminoplast moulding compositions, especially melamine resin moulding compositions, by the addition of catalysts e.g. acids, acid anhydrides, acid amides or salts of organic bases, and thereby to produce industrially valuable, quick-curing moulding compositions. Such moulding compositions have, however, the serious disadvantage that their flowability and storability are impaired.

It is further known that by the addition of plasticizers e.g. p-toluenesulphonamide derivatives, monocresyl glyceryl ethers or 2-ethyl-1,3-hexanediol, the flowability and the fissuring stability of aminoplast moulding compositions, especially melamine resin moulding compositions, can be improved. However, the use of such plasticizers in general impairs essential technical properties of the mouldings made from aminoplasts. Thus, for example, plasticizers that contain hydroxyl groups or other polar plasticizers may considerably increase the water absorption and thereby adversely affect the electrical properties of the finished articles. Moreover, most plasticizers affect the mechanical properties and the heat stability of the finished articles unfavourably.

The present invention provides a new type of plasticizers, namely trans-etherification products of about 2 mols of a methylolated 1,3,5-aminotriazine, containing at least 2 amino groups, highly etherified with a lower alcohol, and 1 mol of a dihydric aliphatic alcohol containing at least one thioether bridge; these compounds are surprisingly eminently suitable for use as plasticizers in the manufacture of quick-curing and nonetheless well flowing, storable aminoplast moulding compositions, especially melamine resin moulding compositions. Particularly suitable among them is a trans-etherification product of about 2 mols of hexamethylolmelamine pentamethyl or hexamethyl ether with thiodiethyleneglycol. An addition of a small quantity below 10% by weight, advantageously 5% by weight, of this substance, referred to the weight of the moulding composition as a whole, apart from the conventionally used curing catalysts, suffices as a rule to produce all the afore-mentioned advantages of the aminoplast moulding composition, especially melamine resin moulding composition.

Accordingly, the present invention is concerned with new plasticizing additives for quick-curing aminoplast moulding compositions, being sulphur-containing derivatives of methylolated aminotriazines, such as are obtained when (I) 1.8 to 2.2 mols, preferably about 2 mols, of a methylolated amino-s-triazone containing at least two amino groups, more than 80% of whose methylol groups are etherified with a lower aliphatic alcohol containing 1 to 4 carbon atoms, is condensed with (II) 1 mol of an aliphatic dialcohol or dimercaptan containing at least one thioether bridge at an elevated temperature.

From the highly etherified methylolated amino-s-triazines, used as starting materials for the manufacture of the new aminotriazine derivatives of this invention, there are particularly suitable condensation products of melaine, highly etherified with a $C_1$ to $C_4$ alcohol such as methanol, ethanol, propanol, isopropanol, n-butanol, isobutanol or tertiary butanol, with formaldehyde.

Such condensation products may contain 1 to 6 methylol groups and are as a rule mixtures of differenet compounds. There may be mentioned trimethylolmelamine highly etherifield with a $C_1$ to $C_4$ alcohol and especially hexamethylolmelamine, more especially hexamethylolmelamine pentamethyl and hexamethyl ether. Further suitable are methylol compounds, highly etherified with $C_1$ to $C_4$ alcohols, of guanamines such as formoguanamine, acetoguanamine, n-butyroguanamine, isobutyroguanamine, methacryloguanamine, sorboguanamine, n-valeroguanamine, caproguanamine, heptanoguanamine, capryloguanamine, 4-ethyl-2-octanoguanamine, stearoguanamine, linoleoguanamine, $\Delta^3$-tetrahydrobenzoguanamine, hexahydrobenzoguanamine, 3-methyl-$\Delta^3$-tetrahydrobenzoguanamine, 3 - methylhexahydrobenzoguanamine, 3,4-dimethyl-$\Delta^3$-1,2, 5,6 - tetrahydrobenzoguanamine, 3,4 - dimethylhexahydrobenzoguanamine; phenylacetoguanamine, tolylacetoguanamine, benzoguanamine, ortho-, meta- and para-toluguanamine, ortho-, meta- and para-xyloguanamine, α- and β-naphthoguanamine; furthermore of diguanamines e.g. those of the formula (I)
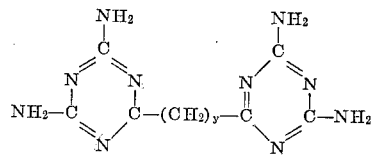

(which y is a small digit) such as adipoguanamine. There may be mentioned the tetramethylolbenzoguanamine and tetramethylolacetoguanamine highly etherified with a $C_1$ to $C_4$ alcohol.

Further suitable are formaldehyde condensation products, highly etherified with a $C_1$ to $C_4$ alcohol, of N-substituted melamines such as N-butylmelamine, N-phenylmelamine, N-tolylmelamine, N-cyclohexylmelamine, N,N-diallylmelamine, N,N-dibenzylmelamine, N-tertiary octylmelamine. Further suitable are methylol compounds, highly etherified with $C_1$ to $C_4$ alcohols, of those derivatives of melamine which still contain at least two amino groups e.g. methylol compounds of melam, melem, ammeline or ammelide, of halogenated aminotriazines such as 2-chloro-4,6-diamino-1,3,5-triazines, or of aminotriazines substituted by alloxy groups, such as 2-alloxy-4,6-diamino-1,3,5-triazine.

As aliphatic dihydric alcohols or dimercaptans containing at least one thioether bridge, which according to this invention are condensed with the highly etherified, methylolated amino-s-triazines, there are particularly suitable compounds of the general formula (II)
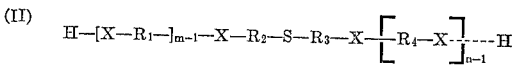

in which X represents an oxygen or a sulphur atom, $R_1$ to $R_4$ are identical or different linear or branched alkylene residues, and $m$ and $n$ each is a whole number from 1 to 4.

A preferred compound of the formula (II) is the thiodiethyleneglycol of the formula

HO—C₂H₄—S—C₂H₄—OH which is readily accessible by condensing 1 mol of H₂S with 2 mols of ethylene oxide. It is also possible to use the thiodipropyleneglycol obtained by condensing 2 mols of propylene oxide with 1 mol of H₂S, or adducts of e.g. 1 to 16 mols of ethylene oxide or propylene oxide with 1 mol of thiodiethyleneglycol or thiodipropyleneglycol.

A particularly good plasticizer for quick-curing melamine resin moulding compositions is the condensation product of approximately 2 mols of hexamethylol melamine hexamethyl ether or pentamethyl ether and 1 mol of thiodiethyleneglycol of the formula

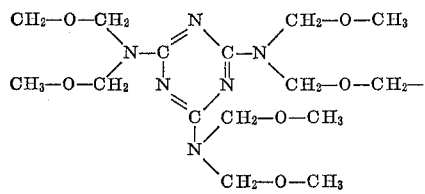
(III)
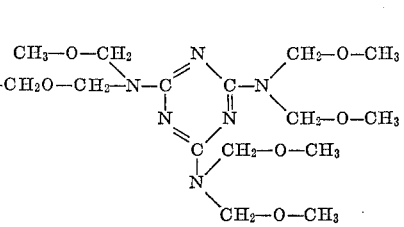

The condensation and trans-etherification respectively of the highly etherified amino-s-triazine+formaldehyde condensate is performed by known methods e.g. advantageously by heating the starting materials in the presence of an acid catalyst e.g. phthalic anhydride, in an inert gas and under reduced pressure, during which the lower alcohol released by the trans-etherification distils over.

In general, the reaction products are colourless liquids or syrups of medium to high viscosity.

As mentioned above, the new sulphur-containing amino-triazine derivatives are used as plasticizing additives for quick-curing aminoplast moulding compositions.

Accordingly, the present invention includes also aminoplast moulding compositions containing a curable aminoplast, preferably a curable melamine resin, a curing catalyst and a plasticizer, characterized in that the plasticizer consists of a condensation product of (I) 1.8 to 2.2 mols, preferably 2 mols, of a methylolated amino-s-triazine containing at least two amino groups, more than 80% of whose methylol groups are etherified with a lower aliphatic alcohol containing 1 to 4 carbon atoms, and (II) 1 mol of a dialcohol or dimercaptan containing at least one thioether bridge.

As a rule, the said plasticizer is used in an amount of less than 10% and preferably of about 5% by weight, referred to the weight of the aminoplast moulding composition as a whole.

The term "curable aminoplast" as used in this context has the meaning generally used in the trade. In the first place it describes the known, still soluble and fusible, condensation products of formaldehyde with urea or above all with melamine. As is known, such condensation products can be converted by heating, in most cases in the presence of a suitable curing catalyst and, if necessary, with application of pressure, into synthetic products having valuable technical properties; they are of special industrial value in the lacquer, laminate and moulding composition sectors. The term "curable aminoplast" further includes quite generally the still soluble and fusible condensation products of aldehydes, especially formaldehyde, if desired in combination with other aldehydes, such as acetaldehyde, butyraldehyde, benzaldehyde, salicylaldehyde, glyoxal, acrolein, furfural and crotonaldehyde, with so-called aminoplast formers such as urea, thiourea, cyanamide, dicyandiamide, aminotriazines, urethanes, guanidine, amino rhodamide, metal rhodamides such as calcium or aluminum rhodamide, guanylthioureas and other urea derivatives and their methylol compounds.

Suitable urea derivatives are e.g. alkylureas and thioureas, arylureas and thioureas, alkyleneureas and diureas such as ethylene or propylene urea, dihydroxyethylene urea and acetylene diurea.

As aminotriazine components of the said condensation products there are suitable, apart from melamine, above all also N-substituted melamines such as N-butylmelamine, N-phenylmelamine, N-tolylmelamine, N,N-diallylmelamine and N-tertiary octylmelamine, as well as melam, melem, ammeline, ammelide, 2,4-diamino-6-phenylamino-1,3,5-triazine; aminotriazines substituted by allyloxy groups; guanamines such as formoguanamine, acetoguanamine, caproguanamine, capryloguanamine, lauroguanamine, stearoguanamine, linoleoguanamine, Δ³-tetrahydrobenzoguanamine, hexahydrobenzoguanamine, benzoguanamine, ortho-, meta- and para-toluguanamine and diguanamines e.g. those of the general formula

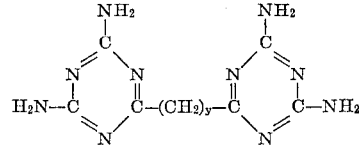

in which y is a small number, such as adipoguanamine.

Hydroxylated residues in the condensation products, such as methylol groups, may be wholly or only partly etherified with methanol, ethanol, n-propanol, isopropanol, n-butanol, isobutanol, methylcyclohexanol, borneol, isoborneol and/or other saturated alcohols. The etherification may also be performed with unsaturated alcohols such as allyl alcohol, methallyl alcohol or 2-buten-1-ol, abietinol and partially etherified dihydric or polyhydric alcohols, inter alia with alkoxyethanols, alkoxypropanols. Condensates containing free hydroxyl groups may also have been etherified by reaction with an alkylene oxide, such as ethyelne oxide, 1,2-propylene oxide, 1,2-butylene oxide or the like, the adducts being stabilized by blocking the terminal groups. Suitable urethanes are above all lower alkylurethanes such as methylurethane, ethylurethane or butylurethane and their methylol derivatives, e.g. methylolbutylurethane. The curable aminoplast resins, which may be incorporated with the moulding compositions of this invention, may also contain modifying additives or they may have been sulphated; such additives are phenol, cresols, xylenols, butylphenols, octylphenols and nonylphenols, and also salicylic acid, especially in the form of pre-condensates based on formaldehyde+phenol, +cresol or +xylenol, and these methylol compounds or more highly condensed novolaks may be added at any desired condensation stage. Further suitable additives are proteins such as acid casein, alkyd resins, aniline and alkylanilines and their formaldehyde resins; carboxylic acid amides such as acetamide, hexamethylenetetramine, ethylenimino polymers such as natural resins e.g. colophony or copal resin. Sulphation is generally carried out by adding sulphur or a sulphur donor, such as hydrogen sulphide, pyrosulphuric acid dichloride, ammonium sulphide or a polysulphide.

Among known catalysts, which can be used in the present moulding compositions, there are particularly suitable organic acids and their anhydrides e.g. isophthalic acid, phthalic anhydride, terephthalic acid, maleic anhydride, fumaric acid, succinic acid, succinic anhydride, dihydrocinnamic acid, benzoic acid, toluenecarboxylic acid, trimesic acid, citric acid, tartaric acid and pyromellitic dianhydride. Furthermore, there may be mentioned so-called latent curing catalysts such as the methyl and ethyl esters of n-toluenesulphonic acid which, under the pressure and temperature conditions used in pressing, give off free acid e.g. p-toluenesulpohnic acid. As such latent curing agents there may also be used inorganic metal salts e.g. zinc sulphate.

The moulding compositions may contain further conventional additives, especially fillers and/or reinforcing agents e.g. glass fibres, asbestos fibres, mica, kaolin, ground dolomite, quartz meal, wood meal and especially cellulose, also mould release agents e.g. stearic acid or zinc stearate.

Compared with the known aminoplast moulding compositions the new aminoplast moulding compositions of this invention, especially those based on curable melamine resins, offer the following advantages:

Higher curing speed without substantial impairment of the flowability and storability of the aminoplast moulding compositions.
Diminished tendency of the moulding to crack and to turn yellowish at elevated temperature.
The fastness to light of the mouldings is not reduced. This enables the costly and less light-fast melamine+phenol moulding compositions to be replaced by substantially cheaper, light-fast products.

Unless otherwise indicated, parts and percentages in the following examples are by weight. The flowability and tendency to cracking of the mouldings described in the following specific examples were tested by the following methods:

(1) Measuring the cup value

In this testing method (developed by ourselves) 70 g. of the moulding composition are introduced into a cup mould according to DIN 53,465, heated at 150° C., and a test moulding is made. On the test moulding the following values are measured:

(a) mean height of the test moulding, if it has no flash fin;
(b) if the test moulding has a flash fin, the weight of this fin.

A fully moulded cup without flash fin is given the cup valve 7. When the flowability under the moulding pressure used is insufficient to fill the mould entirely, the mean height of the moulding obtained is measured with a scale of equal divisions, which starts with 0 at the bottom of the cup and whose scale division 7 coincides with the top edge of the fully moulded cup.

In the case of test mouldings having a flash fin the evaluation is carried out as follows: The flash fin is removed and weighed and the cup value calculated from the formula $$\text{cup value} = 7 + \frac{\text{weight of flash fin in g.}}{2}$$

The upper limit of the scale is the cup value 10, corresponding to a weight of the flash fin of 6 g. or more.

(2) Determining the flowability with the flowmeter according to von Meysenburg/ZWICK According to DIN 53,478 the moulding composition is expressed in this test from a thermostat-controlled specimen chamber (diameter 30 mm.) into a thermostat-controlled flow channel of constant cross-section (10 x 4 mm.) against a counterweight (4 kg.). The path of the counterweight (=flow path) is plotted on a graph as a function of the flow time.

The moulding compositions mentioned in the example were tested as tablets under the following conditions, without any pretreatment.
Test gear: ZWICK & Co., Einsingen bei Ulm, Type Z 460.
Test temperature: 160° C.
Specific pressure on tablet: 120 kg./cm.²

(3) Tendency to cracking

In an internal experiment the tendency to cracking of mouldings (fan propellers), manufactured by the so-called transfer injection moulding process under the under-mentioned conditions, was tested: High frequency pre-warming; press temperature 150° C. Curing time 5 minutes. The tendency to cracking was evaluated in a short-time test after thermal ageing for 24 hours at 120° C. in a drying cabinet.

EXAMPLE 1

A mixture of 975 g. of a liquid methylolmelamine methyl ether (containing per molecule 5.2 methylol ether groups and 0.2 free methylol group), 160 g. of thiodiethyleneglycol and 0.07 g. of phthalic anhydride was heated under nitrogen to 140° C. in a flask equipped with agitator and boiling capillary. Under a vacuum of about 250 mm. Hg. within 2 hours, 81 g. (theory. 80 g.) of methanol are distilled off. Shortly before termination of the reaction the vacuum is gradually improved to 18 mm.

1050 grams of a colourless resin are obtained which has a viscosity of about 57,000 centipoises at 25° C.

EXAMPLE 2

A mixture of 780 g. of crystalline hexamethylolmelamine hexamethyl ether, 128 g. of thiodiethyleneglycol and 0.12 g. of phthalic anhydride is heated under nitrogen to 145° C. in a flask equipped with an agitator and a boiling capillary. Under a vacuum of about 300 mm. Hg, 61 g. of methanol are distilled off within 4 hours. The last remnants of methanol are distilled off under a vacuum of 18 mm. Hg.

797 grams of a colourless resin are obtained which has a viscosity of about 5000 centipoises. It consists mainly of the compound of the formula

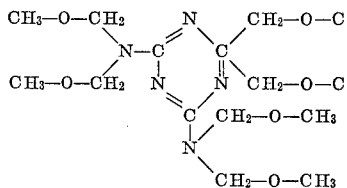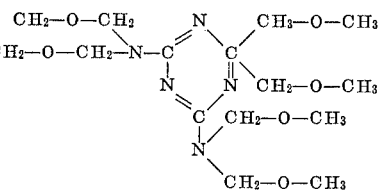

EXAMPLE 3

A melamine+formaldehyde resin solution (molecular ratio of melamine:formaldehyde=1:3) was prepared by condensing melamine and formaldehyde at 80° C. in an aqueous alkaline medium, and the condensation product of methylolmelamine methyl ether and thiodiethyleneglycol, described in Example 1, was added as plasticizer, and this mixture was used for impregnating cellulose. The resulting product was then dried, comminuted and ground for 15 hours in a ball mill with phthalic anhydride and zinc stearate. The resulting moulding composition A had the following composition:

| | Parts by weight |
|---|---|
| Melamine+formaldehyde resin | 61 |
| Cellulose | 33 |
| Zinc stearate | 0.95 |
| Phthalic anhydride | 0.05 |
| Plasticizer of Example 1 | 5 |

Then a known moulding composition B was prepared exactly as the moulding composition A of this invention, with the only difference that no 5 parts of plasticizer of Example 1 were added.

Standardized mouldings were then made from the two moulding compositions A and B. The properties of the moulding compositions and mouldings are compared in the following table. In all experiments the moulding conditions were identical, namely:

Prewarming the moulding composition for 10 minutes at 105° C. in a drying cabinet; moulding at 160° C. under a pressure of 35 tons on the press. Moulding time for VSM bars was 3½ minutes and for DIN bars 5½ minutes.

| Properties of the moulding composition | Moulding composition A with plasticizer of Example 1 | Moulding composition B without plasticizer |
|---|---|---|
| Flowability on the cup at 500 kp./cm.², 160° C. (value) | 9.5 | 7 |
| Flow height on test gear of von Meysenburg/ZWICK at 120 kp./cm.², 160° C. (mm.) | 160 | 30 |
| Minimum press time to produce blister-free plates at 150° C. (seconds) | 25 | 35 |
| Properties of the moulding: | | |
| Impact strength VSM (cm. kp./cm.²) | 5.69 | 5.23 |
| Heat distortion point, ° C., according ISO/R 75 | 193 | 191 |
| Dielectric constant E, 50 c./sec., 25° C. | 8.0 | 8.1 |
| Ohmic resistance (ohm×cm.) | $1.0 \times 10^{13}$ | $2.3 \times 10^{13}$ |
| Arc resistance VDE 0303 (stage) | L4 | L4 |
| Absorption of cold water, 20° C., within 24 hours, percent | 0.2 | 0.2 |
| Tendency to cracking after ageing for 24 hours at 120° C | (¹) | (²) |
| Light-fastness after 400 hours, analogous to DIN54004 (Xeno test) | (³) | (³) |

¹ Slight.  ² Very strong.  ³ Very good.

What is claimed is:

1. A moulding composition containing (1) a curable aminoaldehyde resin (2), a curing catalyst and (3) as plasticizer the heat-condensation product of (I) 1.8 to 2.2 mols of a methylolated amino-s-triazine containing at least two amino groups, and more than 80% of whose methylol groups are etherified with a lower aliphatic alcohol containing 1 to 4 carbon atoms, with (II) 1 mol of a member selected from the group consisting of a dialcohol containing at least one thioether bridge and a dimercaptan containing at least one thioether bridge.

2. A moulding composition according to claim 1, wherein the plasticizer (3) is used in an amount of less than 10%, by weight, referred to the total weight of the moulding composition.

3. A moulding composition according to claim 1, wherein the plasticizer (3) is the compound of the formula

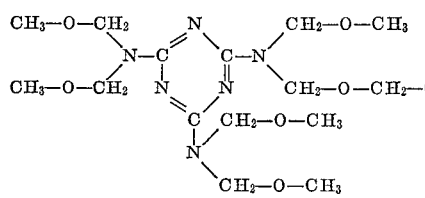

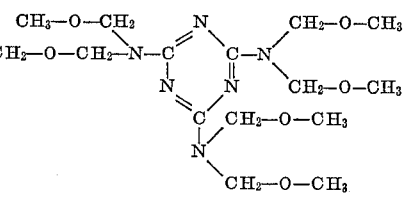

References Cited

UNITED STATES PATENTS 3,141,885   7/1964   Ross et al. _____ 260—249.6
3,267,099   8/1966   Acker _____ 260—249.8

MORRIS LIEBMAN, Primary Examiner

W. H. FLETCHER, Assistant Examiner

U.S. Cl. X.R.

260—249.6, 249.8, 249.9